United States Patent
Mang et al.

(10) Patent No.: US 12,043,164 B2
(45) Date of Patent: Jul. 23, 2024

(54) MOTOR VEHICLE HEADLAMP WITH A LIGHT MODULE AND AN ADJUSTMENT DEVICE FOR ADJUSTING THE MAIN BEAM DIRECTION OF THE LIGHT MODULE

(71) Applicant: Marelli Automotive Lighting Reutlingen (Germany) GmbH, Reutlingen (DE)

(72) Inventors: Dieter Mang, Mössingen (DE); Andreas Stang, Reutlingen (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 18/185,464

(22) Filed: Mar. 17, 2023

(65) Prior Publication Data
US 2023/0294593 A1 Sep. 21, 2023

(30) Foreign Application Priority Data
Mar. 17, 2022 (DE) ...................... 10 2022 106 222.8

(51) Int. Cl.
| | | |
|---|---|---|
| *B60Q 1/068* | (2006.01) | |
| *B60Q 1/04* | (2006.01) | |
| *B60Q 1/05* | (2006.01) | |
| *B60Q 1/06* | (2006.01) | |
| *B60Q 1/064* | (2006.01) | |
| *B60Q 1/076* | (2006.01) | |

(Continued)

(52) U.S. Cl.
CPC .............. *B60Q 1/068* (2013.01); *B60Q 1/045* (2013.01); *B60Q 1/0466* (2013.01);
(Continued)

(58) Field of Classification Search
CPC ........................ B60Q 1/04–124; F21V 14/02
See application file for complete search history.

(56) References Cited

U.S. PATENT DOCUMENTS

| | | | | |
|---|---|---|---|---|
| 2010/0091512 A1* | 4/2010 | Watanabe | .............. | B60Q 1/076 362/523 |
| 2010/0296307 A1* | 11/2010 | Nakabayashi | ......... | B60Q 1/072 362/523 |

(Continued)

FOREIGN PATENT DOCUMENTS

| | | | |
|---|---|---|---|
| CN | 111660916 A | * | 9/2020 |
| DE | 8313450 U1 | | 10/1984 |

(Continued)

OTHER PUBLICATIONS

Machine translation of CN 111660916 A retrieved from the FIT database of PE2E search. (Year: 2023).*

(Continued)

*Primary Examiner* — Colin J Cattanach
(74) *Attorney, Agent, or Firm* — Howard & Howard Attorneys PLLC (57) ABSTRACT

The invention relates to a motor vehicle headlamp that has a housing and a light module that is connected to the housing by an adjustment device for adjusting the main beam direction thereof. The adjustment device has a threaded adjustment assembly and a pivot lever, which is supported in the housing such that it can pivot about a stationary pivot point in relation to the housing. The pivot lever has a movement input coupling section at a distance to the pivot point, with which it is coupled in a flexible manner to the adjustment assembly. The pivot lever is connected to the light module at a movement output coupling section that is at a distance to the pivot point and the movement input coupling section.

14 Claims, 12 Drawing Sheets

(51) Int. Cl.
    *B60Q 1/08*     (2006.01)
    *B60Q 1/10*     (2006.01)
    *B60Q 1/105*     (2006.01)
    *B60Q 1/11*     (2006.01)
    *B60Q 1/115*     (2006.01)
    *B60Q 1/12*     (2006.01)
    *B60Q 1/124*     (2006.01)
    *F21V 14/02*     (2006.01)

(52) U.S. Cl.
    CPC .............. *B60Q 1/0483* (2013.01); *B60Q 1/05* (2013.01); *B60Q 1/06* (2013.01); *B60Q 1/064* (2013.01); *B60Q 1/0683* (2013.01); *B60Q 1/0686* (2013.01); *B60Q 1/076* (2013.01); *B60Q 1/08* (2013.01); *B60Q 1/085* (2013.01); *B60Q 1/10* (2013.01); *B60Q 1/105* (2013.01); *B60Q 1/11* (2013.01); *B60Q 1/115* (2013.01); *B60Q 1/12* (2013.01); *B60Q 1/121* (2013.01); *B60Q 1/122* (2013.01); *B60Q 1/124* (2013.01); *F21V 14/02* (2013.01); *F21V 14/025* (2013.01)

(56) References Cited

U.S. PATENT DOCUMENTS

2018/0142854 A1*   5/2018   Nakao ..................... F21S 41/24
2019/0092218 A1*   3/2019   Kouchi ................. F21S 41/635
2020/0384911 A1*  12/2020   King ..................... B60Q 1/0683
2022/0314868 A1*  10/2022   Hong ..................... B60Q 1/068

FOREIGN PATENT DOCUMENTS

| DE | 20212282 | U1 | | 10/2002 | |
|---|---|---|---|---|---|
| DE | 202010001897 | U1 | | 5/2010 | |
| FR | 3029148 | A1 | * | 6/2016 | ............. B60Q 1/076 |
| KR | 20150046580 | A | * | 4/2015 | |
| WO | WO-2016141926 | A1 | * | 9/2016 | ............. B60Q 1/076 |
| WO | WO-2020230837 | A1 | * | 11/2020 | |
| WO | WO-2021079067 | A1 | * | 4/2021 | ........... B60Q 1/0683 |

OTHER PUBLICATIONS

Machine translation of KR 20150046580 A retrieved from the FIT database of PE2E search. (Year: 2023).*
Machine translation of FR 3029148 A1 retrieved from the FIT database of PE2E search. (Year: 2023).*
Machine translation of WO 2021079067 A1 retrieved from the FIT database of PE2E search. (Year: 2023).*
Machine translation of WO 2016141926 A1 retrieved from the FIT database of PE2E search. (Year: 2024).*
Machine translation of WO 2020230837 A1 retrieved from the FIT database of PE2E search. (Year: 2024).*
Office Action dated Jan. 24, 2023 for German Patent Application No. 10 2022 106 222.8.

* cited by examiner

MOTOR VEHICLE HEADLAMP WITH A LIGHT MODULE AND AN ADJUSTMENT DEVICE FOR ADJUSTING THE MAIN BEAM DIRECTION OF THE LIGHT MODULE

CROSS-REFERENCE TO RELATED APPLICATIONS

The present application claims priority to and all the benefits of German Patent Application No. 10 2022 106 222.8, filed on Mar. 17, 2022, which is hereby expressly incorporated herein by reference.

BACKGROUND OF THE INVENTION

1. Field of the Invention

The present invention relates to a motor vehicle headlamp with a light module and an adjustment device for adjusting the main beam direction of the light module.

2. Description of the Related Art

Such a motor vehicle headlamp is known from DE 202 12 282 U1. A motorized adjustment unit that is supposed to have reduced transverse forces is described in DE 20 2010 001 897 U1.

The motor vehicle headlamp disclosed in DE 202 12 282 U1 has a housing and at least one light module in the housing, which is connected to the housing by an adjustment device supported on the housing. This adjustment device is designed for adjusting the main beam direction of the light module, and has a set screw located in one of the walls of the housing, the end of which can be accessed in order to turn it.

Sliding carriages are typically used, as is the case in DE 202 12 282 U1, for adjusting light sources or entire light modules, which are moved by turning the set screw. The translatory movement of the sliding carriages rotates the light source about its rotational axis. The asymmetrical structures of these sliding carriages (i.e. differing for the right and left headlamps) and the (adhesive) friction of the carriages often cause adjustment errors due to stick/slip effects, as well as "light tremors" due to play in the slides. The sliding carriages are usually tailored to the specific type of vehicle, and thus cannot be used in other types of vehicles without making structural changes. An actuator motor is also attached to these sliding carriages when there are multiple adjustment devices, with which the main beam direction can be altered, instead of, or in addition to, using the set screw for the adjustment.

The direction in which the sliding carriages move is normally the same as the direction in which the vehicle travels, due to the shape of the headlamp housing. This has disadvantages if the relevant pivot axis in the headlamp is not perpendicular thereto, because undesired transverse forces may act thereon.

The set screws normally extend out of the headlamp housing through a radial seal. This has the disadvantage that the set screws have a certain amount of play within the seal in relation to the headlamp housing, which can affect the quality of the adjustment. Furthermore, this form of seal is not very flexible, because the set screw must remain in a precise orientation within the seal. This means that separate compensation elements are necessary to compensate for the adjustment movements in the headlamp.

In rare cases, the set screw passes through an axial seal, which has so far required more complex components in order to secure and adjust the set screw, or has been associated with greater forces needing to be applied to the set screw from the exterior (e.g. when placing a securing element thereon). These then require steel set screws, which are more expensive.

SUMMARY OF THE INVENTION

Based on this, the object of the invention is to create a motor vehicle headlamp which can be adjusted accurately with no stick/slip effects, and which eliminates light tremors due to play in the guides. The motor vehicle headlamp according to the invention should be more flexible with regard to the alignment of the set screw, without sacrificing the quality of the seal or the operation of the set screw.

It is also desirable to reduce the number of parts and simplify the assembly, as well as make use of uniform components for both the right and left motor vehicle headlamps.

It is also desirable to be able to use the invention in different types of motor vehicles, which can be achieved with a very compact structure and flexibility in fitting it to the available space provided for motor vehicle headlamps in motor vehicles of different types.

These problems are solved by a motor vehicle headlamp according to the invention that has a threaded adjustment shell which is coupled to the set screw in an adjustment assembly that can move axially, in that the adjustment device contains a pivot lever, which is supported in the housing such that it can be pivoted in relation thereto about a stationary pivot point, and has a movement input coupling section at a distance to the pivot point, by which it is coupled to the threaded shell with a flexible connection, and in that the pivot lever is connected at a movement output coupling section on the pivot lever to the light module, which is at a distance to the pivot point and the movement input coupling section.

As a result, the translatory movement components necessary for pivoting the light module about a pivot axis are not obtained by the sliding of a carriage, but instead by pivoting and bending the pivot lever. This results in no play in the adjustment system, and any slip/stick effects are eliminated.

In one embodiment of the invention, the pivot lever is flexibly coupled at its movement input coupling section to the threaded shell.

The threaded shell may also be a part, and in one embodiment an integral, materially bonded part, of the pivot lever.

In one embodiment, the set screw fits into the threaded shell when the adjustment device is assembled, such that the threaded shell is coupled with the set screw in a threaded adjustment assembly that can move axially, which is held together by a metal clamp.

In another embodiment of the invention, an interior space in the housing is sealed with an elastic axial seal where it has an opening through which the set screw protrudes such that it can be rotated from the outside.

The axial seal for the set screw may also be compressed in the axial direction when the adjustment device is assembled.

A first bevel gear, which presses axially against the outer end of the set screw, also contributes to the compression of the axial seal in the axial direction.

In another embodiment, the housing has an annular bearing surface for the axial seal and receivers for the first bevel gear and a second bevel gear, wherein the rotational axis of the second bevel gear is at an angle to the rotational axis of the first bevel gear, and the second bevel gear meshes with the first bevel gear.

The adjustment device may also have an actuator motor, which is coupled to the movement output coupling section such that the adjustment movements of the movement output coupling section and the actuator motor can be combined in an accumulative manner.

This results in an adjustment device with which a fundamental adjustment of the main beam direction can be made manually with the set screw, and a motorized adjustment can then be used to refine this fundamental adjustment. When installing the motor vehicle headlamp, the fundamental adjustment is used to set a horizontal light/dark boundary, and the motorized adjustment takes place during operation, e.g. in order to regulate the range of the beam.

By attaching the actuator motor to the movement output coupling section, the adjustment device retains its flexibility with regard to its suitability for use with a variety of housing shapes for different types of motor vehicle headlamps.

In another embodiment, the coupling takes place with an intermediate part, which also serves as an adapter for different types of actuator motors.

The adapter and the actuator motor connected thereto is attached to the movement output coupling section of the pivot lever by a bayonet connection.

The adapter is also designed to secure the connector plug the actuator motor is attached with a plug-in connection.

In another embodiment, the set screw and the pivot lever have symmetrical structures in relation to their longitudinal axes. The adapter and actuator also have a symmetrical structure in relation to their longitudinal axes. This symmetry allows the same parts to be used in both the left and right headlamps. The motor vehicle headlamp on the whole has the advantage that it can be standardized to a large extent, such that the adjustment device can be readily incorporated in a variety of motor vehicle headlamps with housings of different shapes.

The placement of the set screw is also made such that there is as little offset as possible between the set screw and the central axis of the actuator motor. This ensures that the set screw can be turned easily, and the light source connected thereto can be accurately adjusted manually.

Further advantages can be derived from the dependent claims, the description, and the drawings.

It is understood that the features specified above and explained below can be used not only in the respective specified combinations, but also in other combinations, or in and of themselves, without abandoning the scope of the present invention.

BRIEF DESCRIPTION OF THE DRAWINGS

Exemplary embodiments of the invention are illustrated in the drawings, and shall be explained in greater detail in the following description. The same reference symbols are used throughout for the same elements in the different drawings. Therein, schematically:

FIG. 4AL shows a side view of the adjustment device shown in FIG. 1B, with a pivot lever in a first pivotal position;

FIG. 4BL shows a side view of the adjustment device shown in FIG. 1B, with the pivot lever in a second pivotal position;

FIG. 4AR shows the shape of a flexible part when the pivot lever is in the first pivotal position;

FIG. 4BR shows the shape of the flexible part when the pivot lever is in the second pivotal position;

DETAILED DESCRIPTION OF THE INVENTION

Figure 1A:
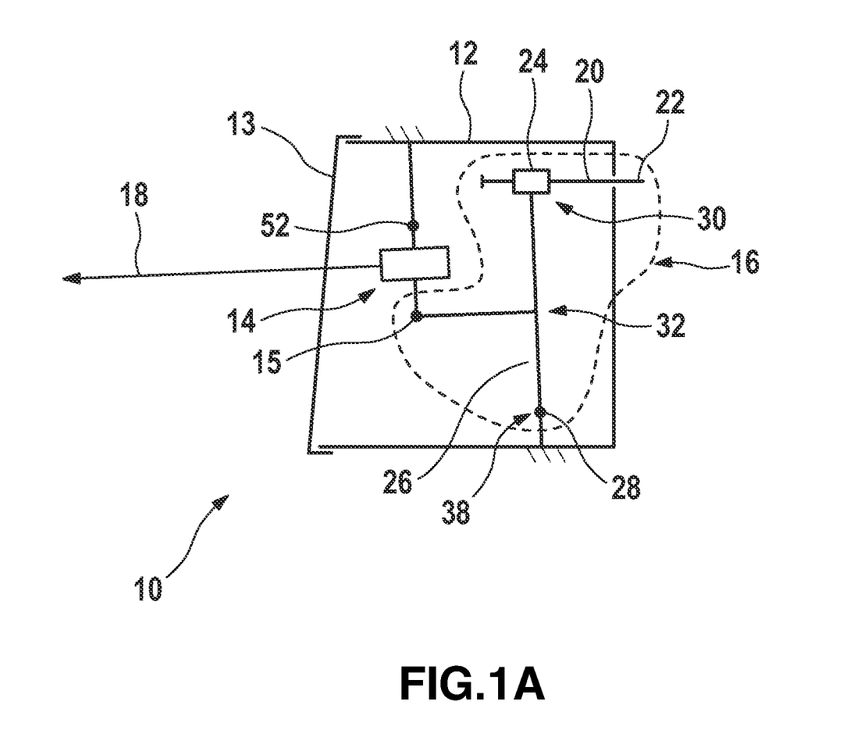
FIG. 1A shows an exemplary embodiment of a motor vehicle headlamp according to the invention.

FIG. 1A shows a motor vehicle headlamp 10 that has a housing 12 and a light module 14 inside the housing 12. The hole where light is projected out of the housing 12 is covered by a transparent cover plate 13. One or more light modules 14 can be placed in the housing 12. The light module 14 is connected to the housing 12 by an adjustment device 16 supported on the housing 12. The connection between the adjustment device 26 and the light module 14, or a bracket for the light module, is obtained by a form-fitting ball and socket connection 15 without any play.

The adjustment device 16 is designed for adjusting the main beam direction 18 of the light module 14, and contains a set screw 20, one end 22 of which is rotatably supported in a wall of the housing 12 such that it can be turned in place in relation thereto.

The motor vehicle headlamp 10 has a threaded shell 24, which is coupled to the set screw 20 and a metal clamp to form a threaded adjustment assembly that can move axially. A turning of the set screw 20 about it longitudinal axis is converted to a translatory movement of the threaded shell 24 by the threading. The adjustment device 16 contains a pivot lever 26, which is supported in the housing 12 such that it can pivot about a stationary pivot point 28 in relation to the housing 12, and which has a movement input coupling section 30 at a distance to the pivot point 28. The pivot lever 26 is connected to the threaded shell 24 at the movement input coupling section 20 with a flexible connecting element. The pivot lever 26 is also connected at a movement output coupling section 32 to the light module 14, which is at a distance to the pivot point 28 and the movement input coupling section 30 of the pivot lever 26. The connection between the adjustment device 16 and the light module 14 is obtained by the form-fitting ball and socket connection 15 without any play. With a translatory movement of the ball and socket connection 15, the light module 14 is pivoted about the pivot axis 52, thus altering the main beam direction 18.

Figure 1B:
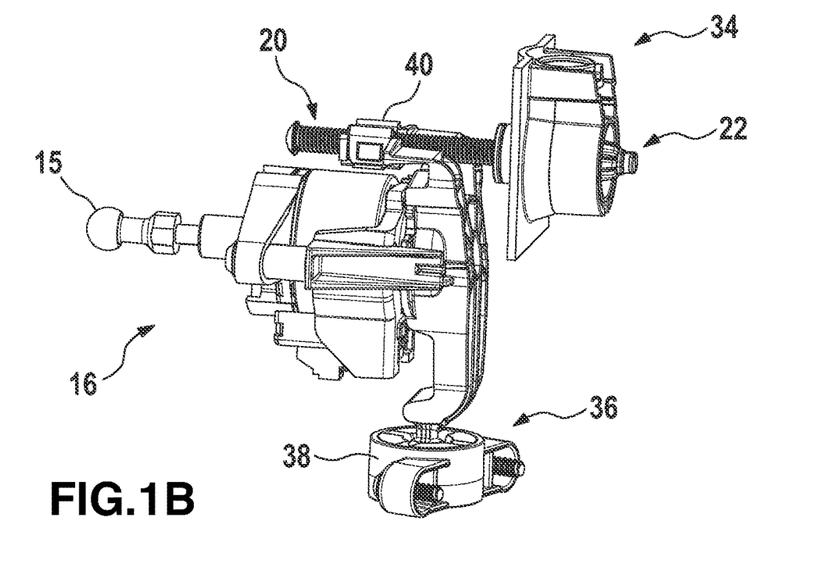
FIG. 1B shows a detailed illustration of a design of the exemplary embodiment shown in FIG. 1A.

FIG. 1B shows a detailed illustration of an exemplary embodiment of the adjustment device 16 shown in FIG. 1A, which has a housing interface 34 in the form of a hole cut in the housing 12, on which the adjustment device 16 is supported, and in the form of parts 36 for supporting and securing the pivot lever 26 in the housing 12.

The parts 36 for supporting and securing the pivot lever 26 in the housing include a ball joint 38, which is attached to the housing 12 such that the pivot lever 26 can pivot in the housing 12 about a stationary pivot point 28 in the housing 12 via the ball joint 38.

Figure 1C:
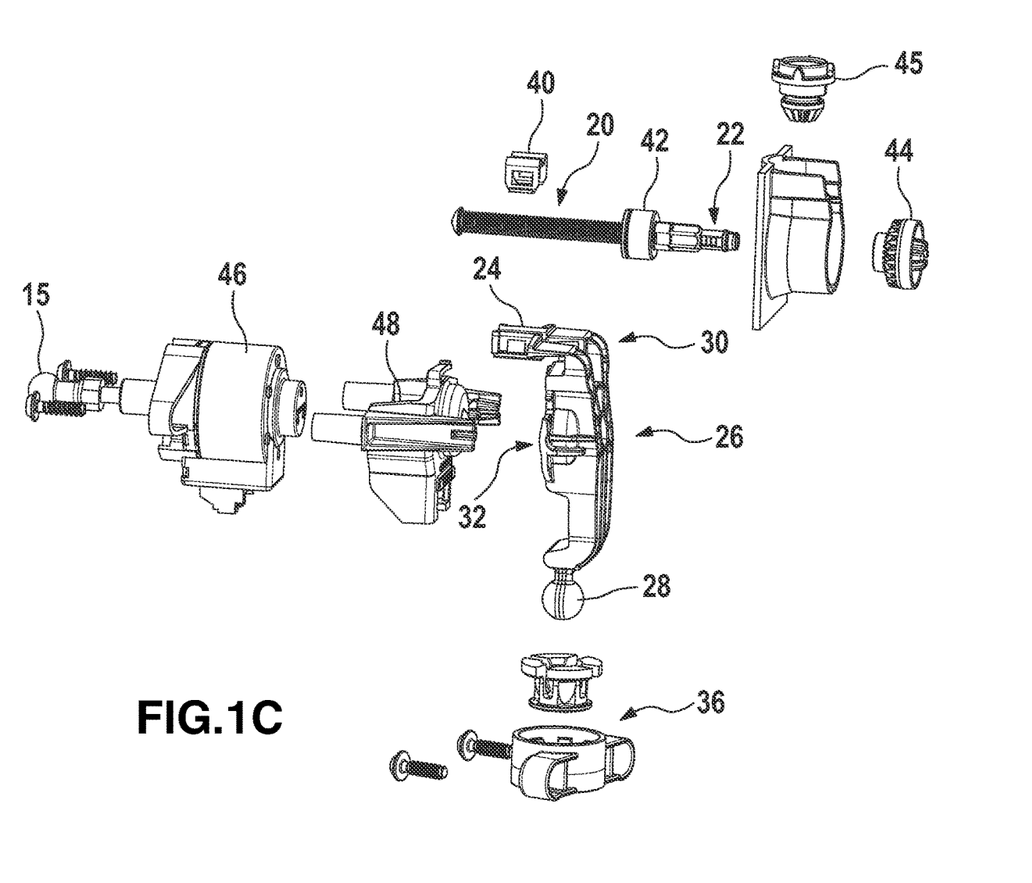
FIG. 1C shows an embodiment of the adjustment device shown in FIG. 1B, in an exploded view.

FIG. 1C shows the adjustment device 16 shown in FIG. 1B in an exploded view. The pivot lever 26 is supported in the housing 12 such that it can pivot about a stationary pivot point 28 in the ball joint 38 in relation to the housing 12, and has a movement input coupling section 30 and a movement output coupling section 32.

The pivot lever 26 is flexibly coupled at the movement input coupling section 30 to the threaded shell 24, which is a part, and may be an integral, materially bonded part, of the pivot lever 26. One end of the set screw 20 is supported in a wall of the housing 12 such that it can be turned in place in relation to the housing 12. The set screw 20 rests on the threaded shell 24 in the assembled state, such that the threaded shell 24 is coupled to the set screw 20 in an adjustment assembly that can move axially, which is held together by a metal clamp 40. By using a threaded shell 24 that is open toward the top, and the flexible metal clamp 40, the threaded shell 24 and the set screw 20, which meshes therewith, can move radially in relation to one another, such that the if an excessive load is applied thereto, the threads can slip. The set screw 20 can continue to turn, without stripping the threads. This protects the adjustment assembly against damage.

The interior of the housing 12 is sealed with an elastic axial seal 42 at the hole where the set screw 20 protrudes such that it can be turned. The axial seal 42 forms a tight seal around the set screw 20. The tension is generated by a first bevel gear 44, which bears axially against the end 22 of the set screw protruding from the hole, thus compressing the axial seal 42. The tension is such that it is greater than the axial forces applied to the set screw 20 when the motor vehicle headlamp 10 is in operation.

The movement output coupling section 32 is at a distance to the pivot point 28 and the movement input coupling section 30, and in this case is between the movement input coupling section 30 and the pivot point 28. This assembly results in a single-arm lever. The movement output coupling section 32 is coupled to an actuator motor 46 such that the movements of actuator motor 46 and the movement output coupling section 32 on the pivot lever 26 are combined in an accumulative manner to form the overall adjustment movements.

The coupling is obtained with an intermediate piece, which also forms an adapter for different actuator motors. The adjustment device can therefore be combined with actuator motors of different strengths, for example, which are designed for different light modules (e.g. of different weights), the adjustment of which require different amounts of power.

Figure 2:
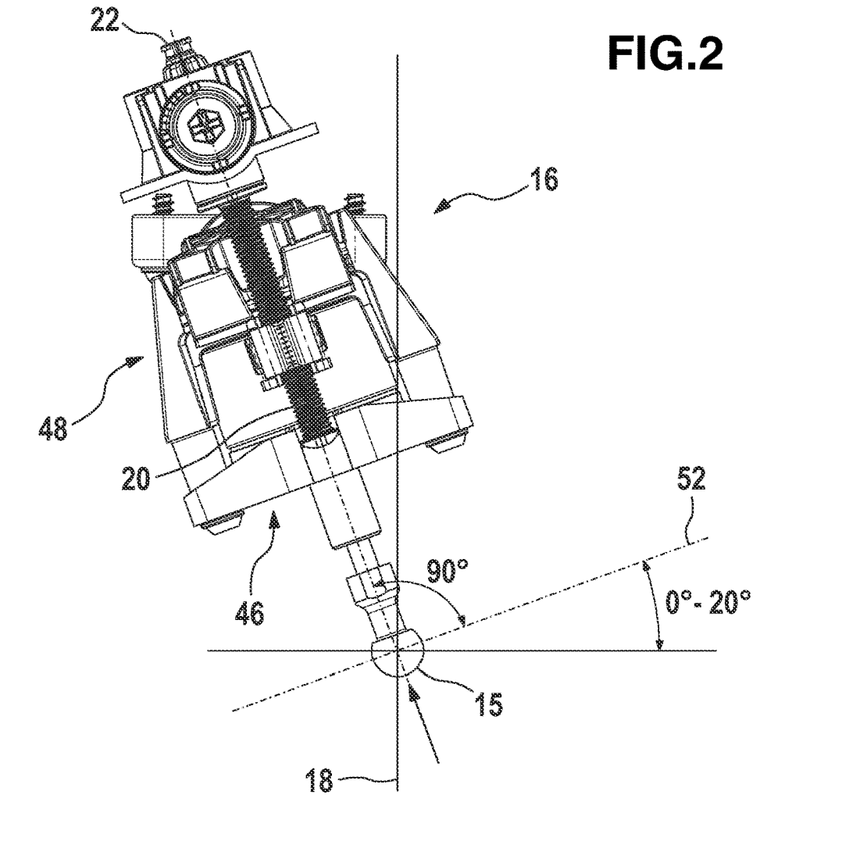
FIG. 2 shows how the adjustment device is placed in a headlamp.

FIG. 2 shows an assembly of the adjustment device 16 in a motor vehicle headlamp, in which the orientation of the motor vehicle headlamp is defined by its main beam direction 18. The main beam direction 18 normally corresponds to the direction of travel in an intended use of the motor vehicle headlamp 10 in a motor vehicle. In FIG. 2, the pivotal axis 52 of the light module is not at a right angle to the direction of travel.

With the invention, the longitudinal axis of the set screw 20 in the motor vehicle headlamp can be perpendicular to the relevant pivotal axis 52 of the light model in the motor vehicle headlamp even when it deviates as much as 20° from the direction of travel/main beam direction 18. This advantageously results in only minimal transverse forces, such that lateral guides are unnecessary.

Figure 3A:
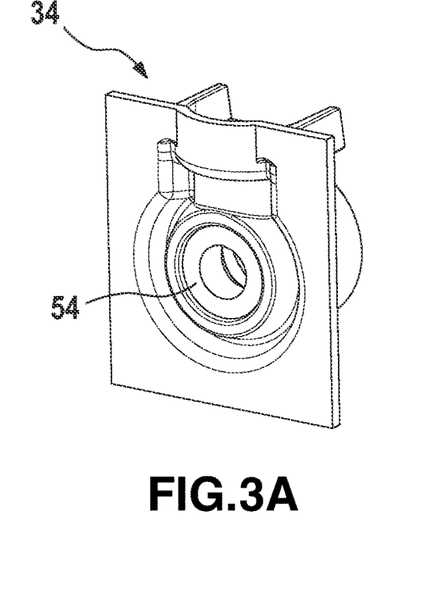
FIG. 3A shows an illustration of a housing interface for a motor vehicle headlamp according to the invention from the inside.
Figure 3B:
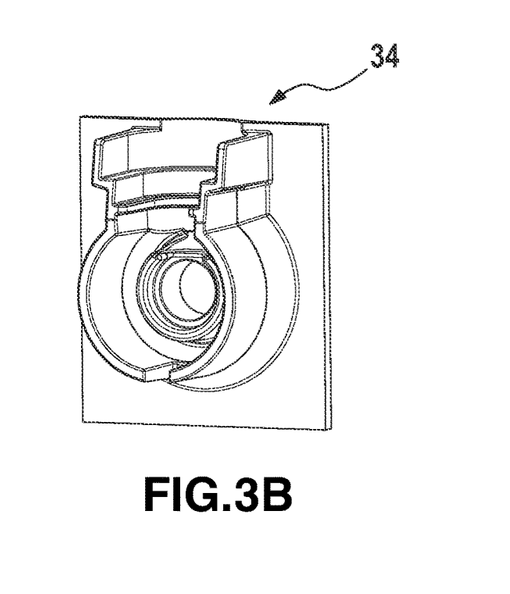
FIG. 3B shows a view of this housing interface from the outside.

FIG. 3A shows the housing interface 34 from the inside, with the hole through which the set screw 20 protrudes, and FIG. 3B shows this housing interface 34 from the outside. The housing interface 34 contains the part of the wall of the housing 12 in which one end 22 of the set screw 20 is supported in a wall of the housing 12 such that it can be turned in place in relation to the housing 12. Another housing interface contains receivers for attaching the parts 36 for supporting and attaching the pivot lever in the housing.

Because of the simple and robust housing interface 34, there is no need for an inner pusher on the housing tool when molding the housing 12.

FIG. 3A shows an annular bearing surface 54 for the axial seal 42, and FIG. 3B shows the receiver for the first bevel gear 44 and second bevel gear 45, the rotational axis of which is at a right angle to the rotational axis of the first bevel gear 44, and which meshes with the first bevel gear 44. The set screw 20 can be turned from the outside by rotating the first bevel gear 44 or the second bevel gear 45, depending on which bevel gear can be more easily accessed for the fundamental adjustment when installing the motor vehicle headlamp 10.

Figure 4:
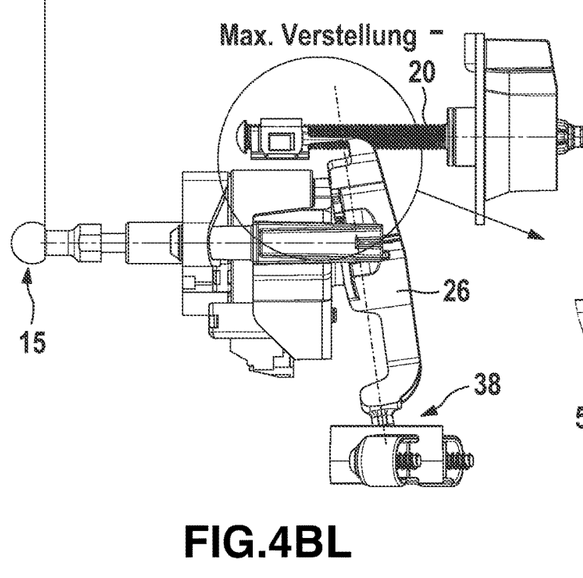

FIG. 4AL shows a side view of the adjustment device in FIGS. 3A-3B with the pivot lever 26 at a position where it is moved as far as possible in a first direction (toward the right in FIG. 4AL).

FIG. 4BL shows a side view of the adjustment device in FIGS. 3A-3B in which the pivot lever is moved as far as possible in a second direction (toward the left in FIG. 4BL), which is opposite to the first direction.

The adjustment movements between these two maximum positions are obtained by pivoting the pivot lever 26 about the pivot point 28 of the ball and socket joint 38, such that the pivotal movement is then applied to a light module via the movement output coupling section on the pivot lever 26, as shown by way of example in FIGS. 1A-1C.

The translatory movement of the pivot lever 26 in the range relevant for adjusting the light module 14 is obtained with the set screw 20, resulting in the pivot lever pivoting about the middle of the ball in the ball and socket joint. The angular compensation between the pivot lever 26 and the set screw 20 necessary for this is obtained through the flexible part 56 of the pivot lever 26. The shapes of the flexible part 56 at the maximum adjustment positions of the pivot lever 26 are shown in FIGS. 4AR and 4BR. The flexible part 56 can be regarded as part of the movement input coupling section 30.

Figure 5A:
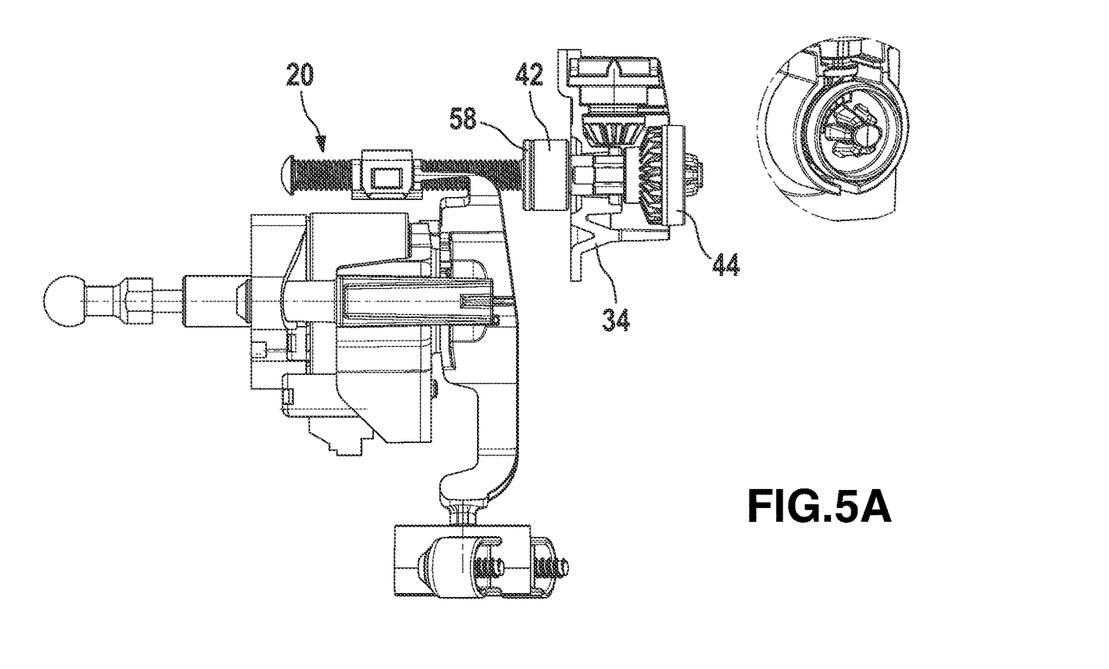
FIG. 5A shows a set screw in a first assembly state, when the axial seal is not compressed.
Figure 5B:
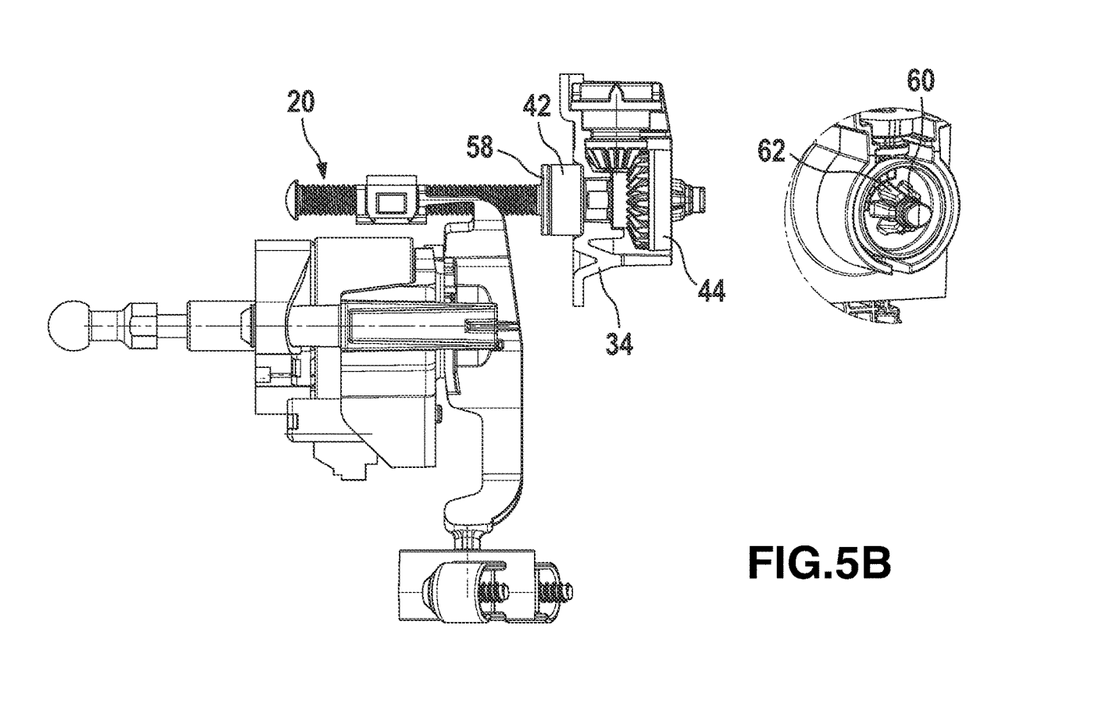
FIG. 5B shows the set screw in a second assembly state, when the axial seal is compressed.

FIGS. 5A and 5B illustrate how the set screw, which is connected by the threaded assembly to the pivot lever 26 is sealed against the headlamp housing with the axial seal 42 inside the housing. FIG. 5A shows the set screw 20 with the axial seal 42 and the hole in the housing in a preassembled state, and FIG. 5B shows the objects in FIG. 5A in the fully assembled state. The axial seal 42 is held in place on the inside by a collar 58 encompassing the set screw. The axial seal 42 is compressed from the outside in two steps by the set screw 20 and a plastic piece, e.g. a first bevel gear 44.

In a first step, the set screw 20 is placed on the plastic part in the pre-assembly position shown in FIG. 5A. This can be done manually, with a minimum of force. The set screw 20 has an outer collar 60, and the plastic part has a soft gripping element 62 which can fit over the external collar 60 when the set screw 20 is pulled or pushed outward in a second step, which can be done using a toggle press, for example, resulting in the axial seal 42 being compressed to a certain extent against the bearing surface 54 on the housing interface. The compression eliminates the play in the system, or at least reduces it substantially.

A potential minimal radial play between the set screw 20 and the first bevel gear 44, which would result in undesired play in the overall adjustment system (hysteresis) is eliminated by small compression fins formed on the first bevel gear 44.

Figure 6A:
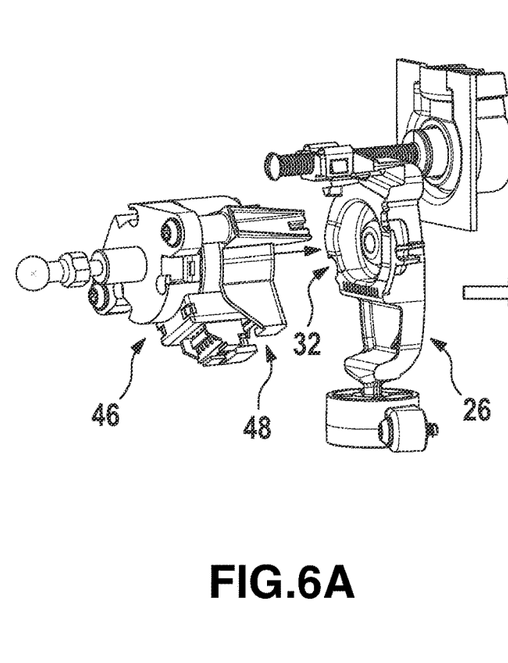
FIG. 6A shows a first assembly state, when attaching an actuator motor with an adapter to a movement output coupling section of the pivot lever.
Figure 6B:
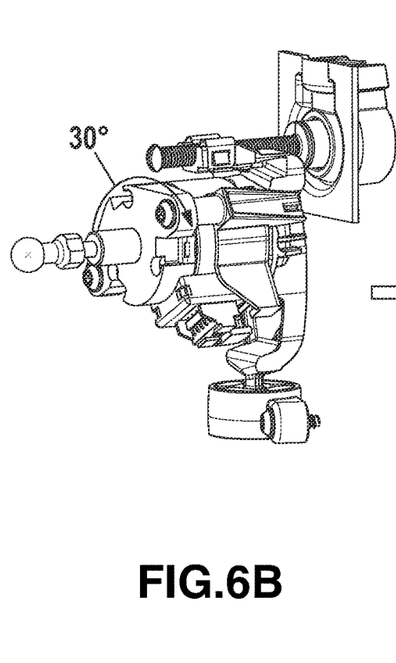
FIG. 6B shows a second assembly state, when attaching the actuator motor with the adapter to the movement output coupling section.
Figure 6C:
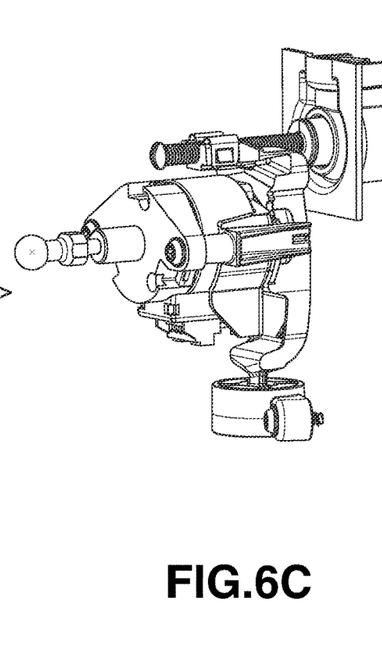
FIG. 6C shows a third assembly state, when attaching the actuator motor with the adapter to the movement output coupling section.

The first bevel gear 44 can be rotated directly from behind, or by a second bevel gear 45 at an arbitrary angle thereto. The housing interface 34 can contain the second bevel gear 45 for this, which has already been described in the context of FIGS. 3A-3B. If the adjustment device 16 is used as an adjustment device combined with an actuator motor, an adapter 48 may be used to attach the actuator motor 46 to the movement output coupling section 32 on the pivot lever 26 using a bayonet mount. FIGS. 6A, 6B, and 6C show a sequence of three assembly steps for attaching the actuator motor 46 with the adapter 48 to the movement output coupling section on the pivot lever 26.

Figures 7A, 7B:
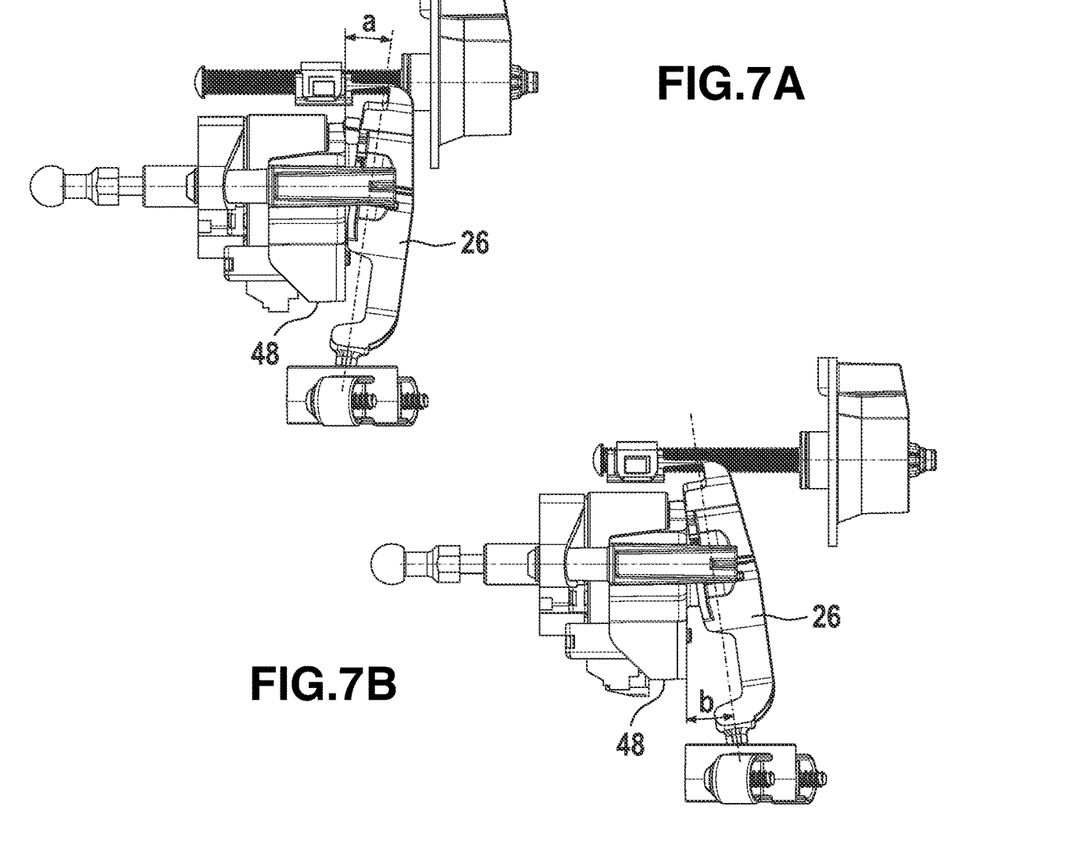
FIG. 7A shows a first angle a between the pivot lever and the adapter.
FIG. 7B shows a second angle b between the pivot lever and the adapter.
Figure 8:
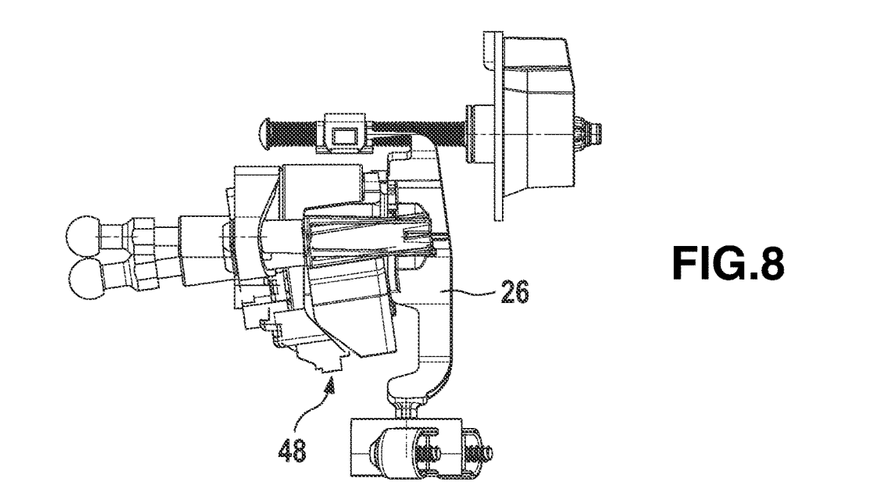
FIG. 8 shows the movement that occurs when joining an actuator motor to the adapter and the movement output coupling section of the pivot lever.

The bayonet mount is designed such that it satisfies the following three conditions:

An angular compensation can be obtained for the angles a and b between the pivot lever 26 and the adapter 48 that is necessary when the pivot lever is pivoted 26. FIG. 7A shows angle a, and FIG. 7B shows angle b, between the pivot lever 26 and the adapter 48. The adapter 48 with the actuator motor attached thereto is always precisely aligned with the adjustment element to which the light module 14 is attached. The (rotational) interaction of the bayonet mount with the flexible part 56 of the pivot lever 26 (as shown in FIG. 8), can compensate for any tolerances or angular discrepancies (resulting from the pivoting).

The connection between the pivot lever 26 and the adapter 48 is absolutely devoid of play. This is obtained by a defined tensioning obtained with the bayonet mount.

The pivot lever 26 and adapter 48 are always in the same alignment to one another during the installation of the headlamp. This is obtained in that when the pivot lever 26 is pivoted in relation to the adapter 48, as shown in FIG. 8, a return torque is generated, which returns the adapter 48 to the installation position (where it is not subjected to forces). The return torque is generated in that the pivoting of the pivot lever 26 in relation to the adapter 48 takes place over two pivotal axes, which are offset to one another.

Figure 9A:
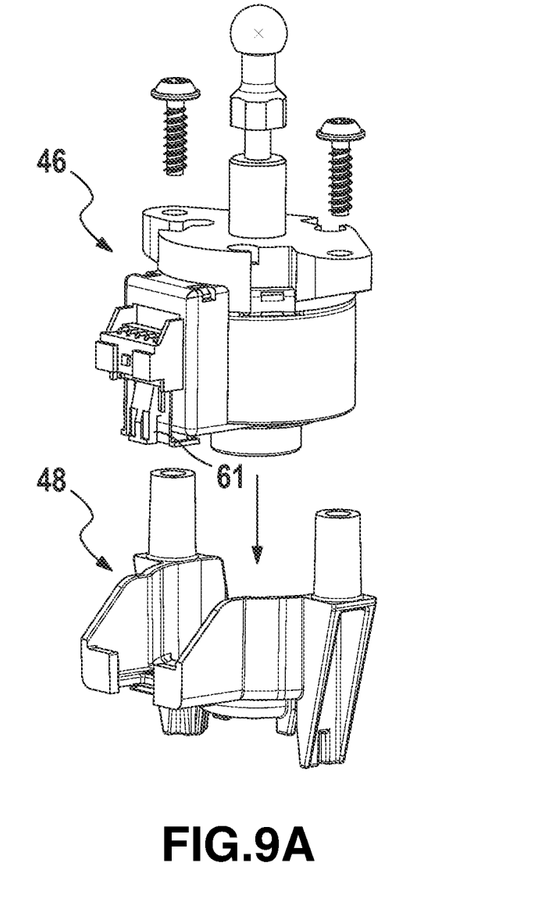
FIG. 9A shows an assembly comprising a first type of actuator motor and an adapter, prior to assembly.
Figure 9B:
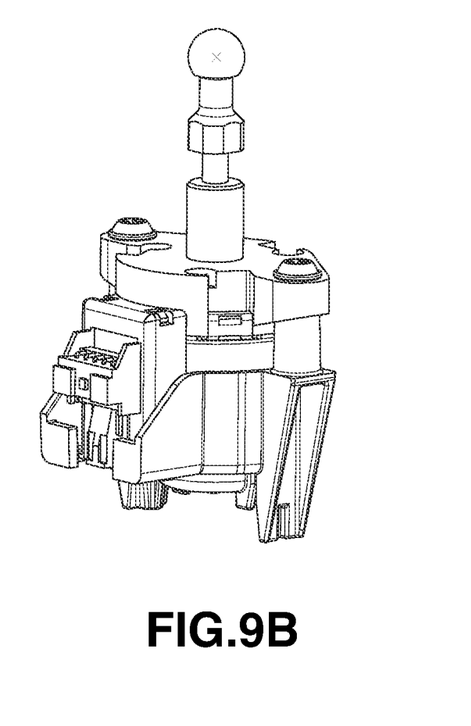
FIG. 9B shows the assembly shown in FIG. 9A in the assembled state.
Figure 9C:
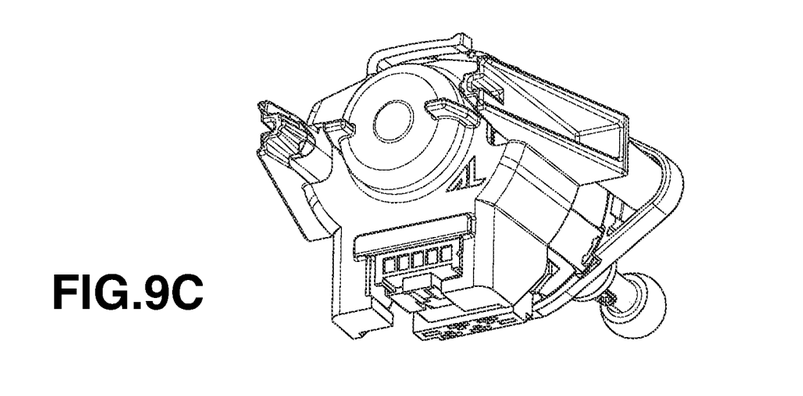
FIG. 9C shows the assembly shown in FIG. 9A from above, looking at the assembled state, with the plug secured in place by the adapter.

The adapter 48 also functions to secure the plug-in connection for the actuator motor. FIG. 9A shows an assembly composed of the actuator motor 46 and the adapter 48, prior to assembly, FIG. 9B shows the assembly in the assembled state, and FIG. 9C shows the assembly from above, looking at the assembled state, with the plug 61 for a first type of actuator motor secured in place by the adapter 48.

Figure 9D:
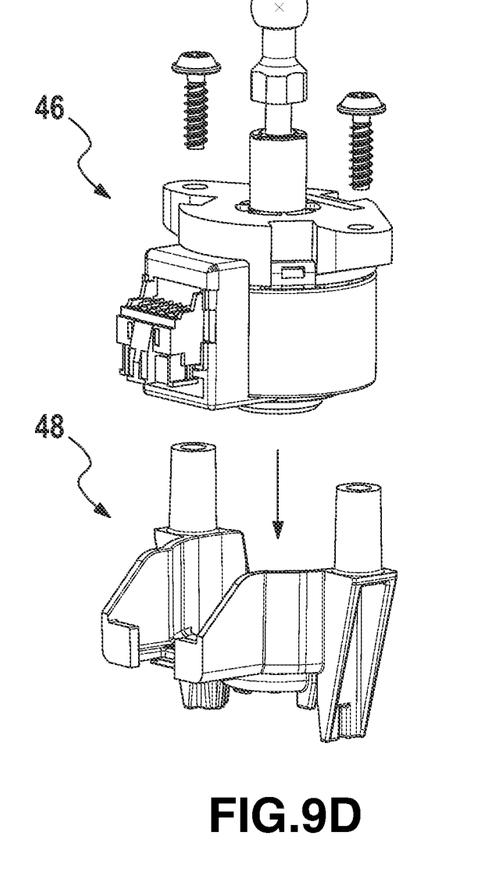
FIG. 9D shows an assembly comprising a second type of actuator motor and an adapter, prior to assembly.
Figure 9E:
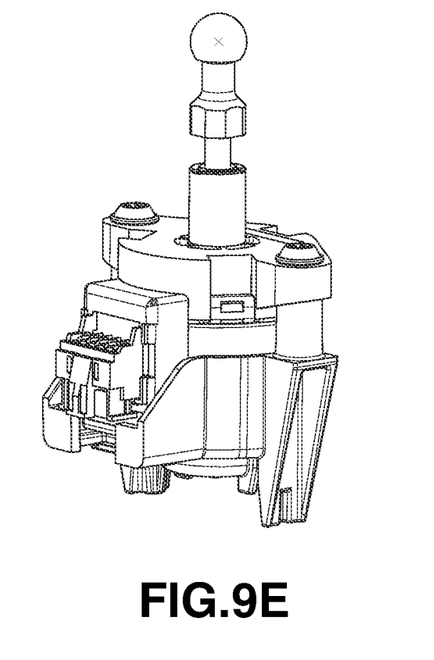
FIG. 9E shows the assembly shown in FIG. 9D in the assembled state.
Figure 9F:
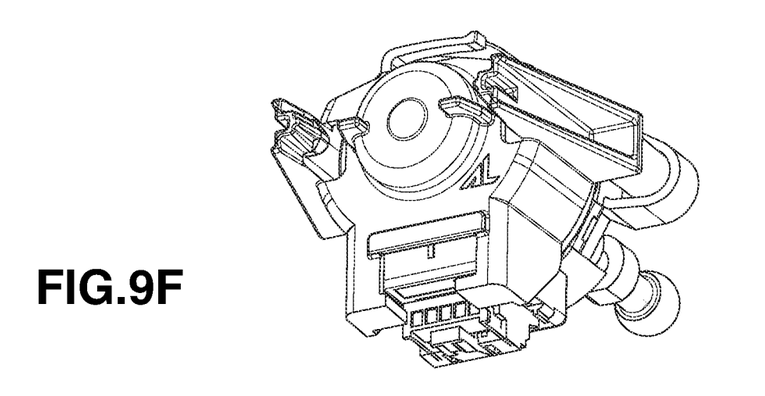
FIG. 9F shows the assembly shown in FIG. 9D from above, looking at the assembled state and with the plug secured in place by the adapter.
Figure 10A:
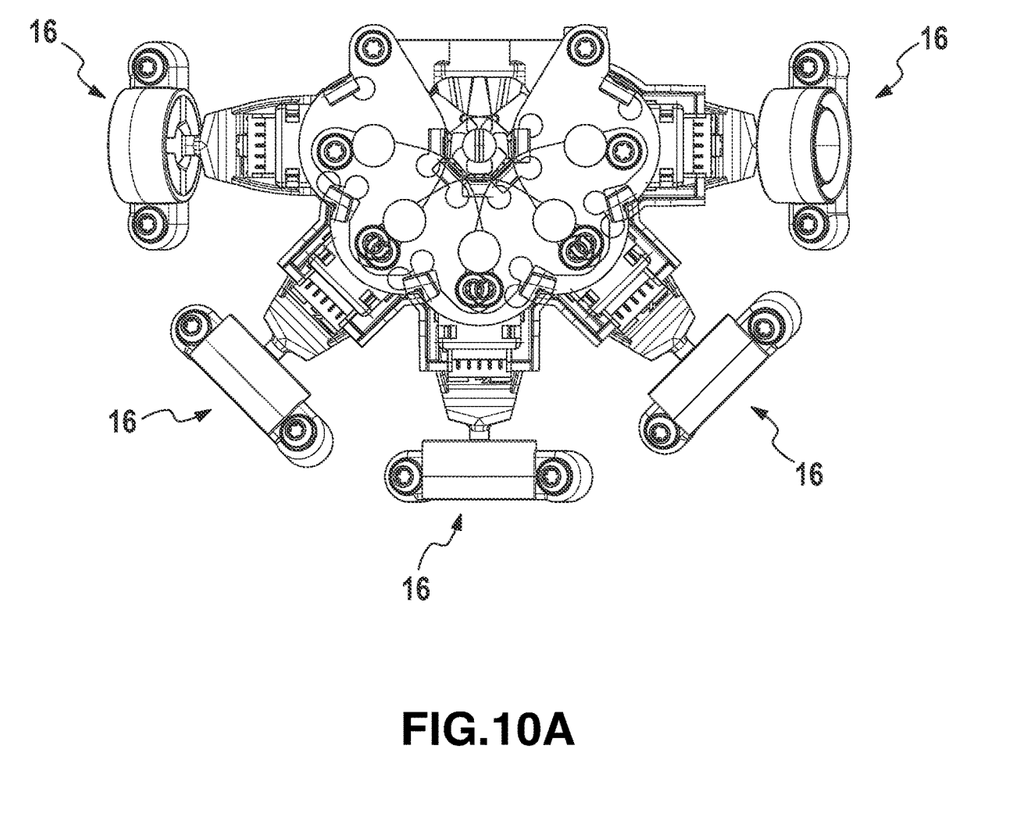
FIGS. 10A-10D show different installation positions that can be obtained with the adjustment device.
Figure 10B:
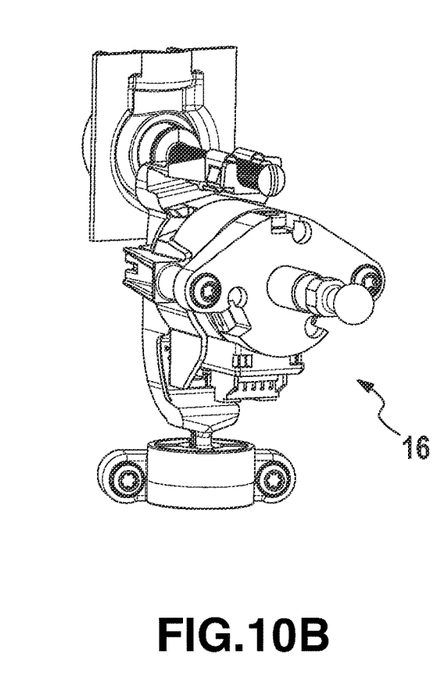
Figure 10C:
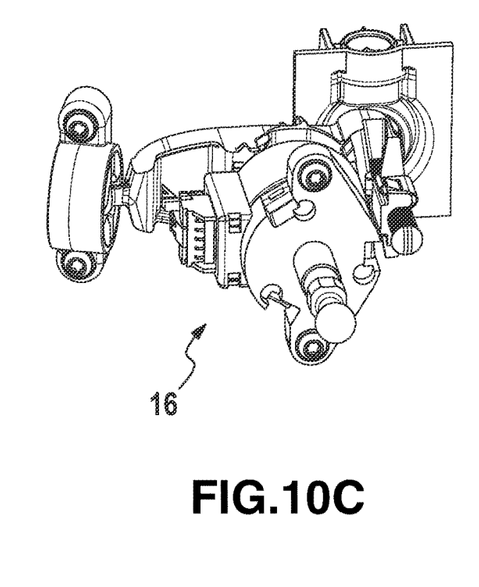
Figure 10D:
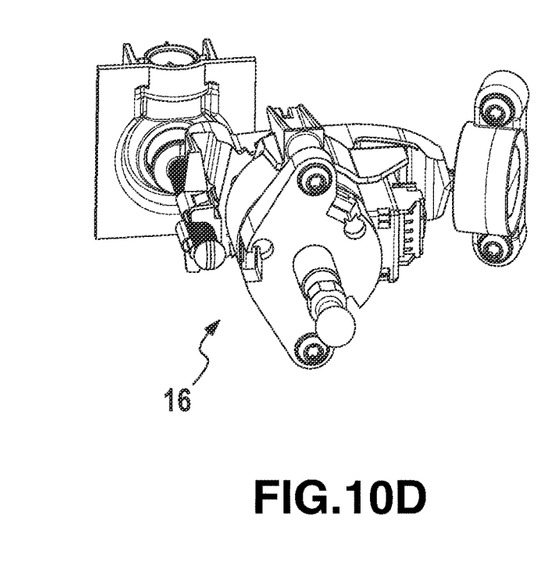

FIG. 9D shows an assembly composed of the actuator motor 46 and the adapter prior to assembly, FIG. 9E shows the assembly in the assembled state, and FIG. 9F shows the assembly from above, looking at the assembled state with the plug 61 for a second type of actuator motor secured in place by the adapter 48.

The adjustment device 16 can be used in a number of ways. Depending on the available space in a motor vehicle headlamp 10, the installation position of the adjustment device 16 in the housing 12 may differ.

FIGS. 10A to 10D show different installation positions in which the adjustment device 16 can be installed without modifying the structure of the adjustment device 16. The adjustment device 16 thus forms a standard module, which can be installed in a wide variety of different headlamps. This reduces the necessity of using new components for headlamps of new designs. This makes it possible to reduce the variety of components used in producing headlamps, resulting in a more sustainable design and lower costs through the multiple uses of identical adjustment devices in different positions in different headlamps.

In each of these positions (see the examples in FIGS. 10A-10D), compensation for tolerances is ensured. Depending on which position is used, either the seal or the pivot axis between the adapter 48 and the pivot lever 26 assumes a majority of the compensation. In any case, compensation without any play is always ensured.

Figure 11:
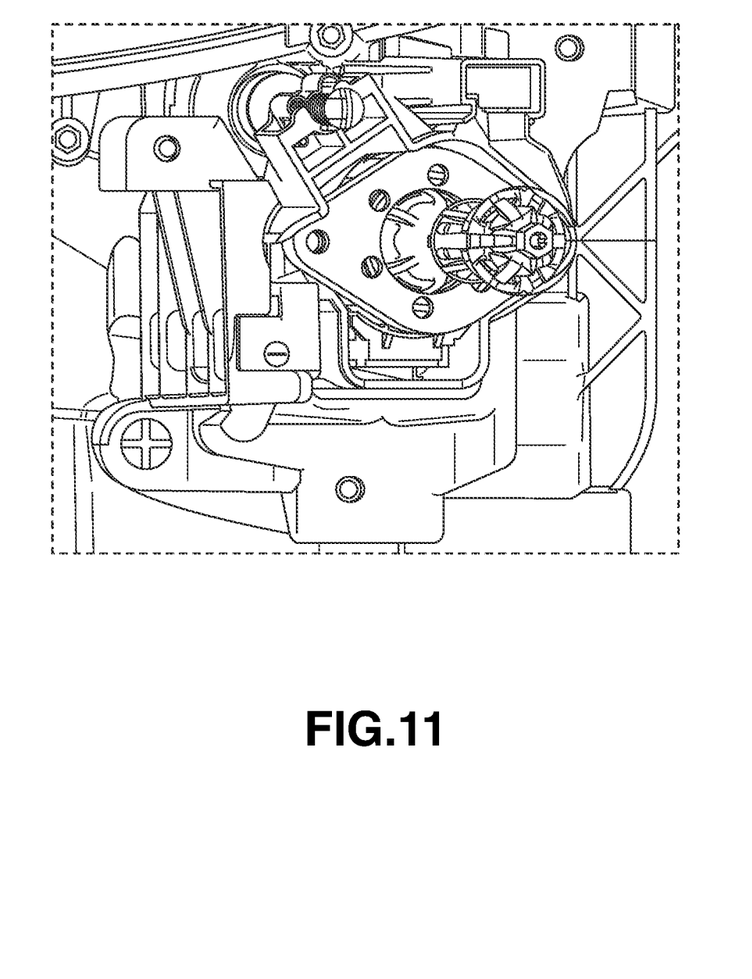
FIG. 11 shows a use of the set screw with the axial seal in conjunction with a conventional sliding carriage, not according to the invention.

The adjustment device 16 can be combined with conventional components. If a headlamp does not easily accommodate it (due to lack of space, or the shape thereof, . . . ), individual components of the invention can be used advantageously. By way of example, the set screw 20 and axial seal 42 can be used with a conventional sliding carriage, as shown in FIG. 11.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A motor vehicle headlamp comprising:
a housing;
at least one light module in the housing, wherein the at least one light module is connected to the housing by at least one adjustment device supported on the housing, and wherein the light module is pivotable about at least one pivot axis; and
the at least one adjustment device, wherein the at least one adjustment device is designed for adjusting the main beam direction of the at least one light module by pivoting the light module about the at least one pivot axis, wherein the at least one adjustment device comprises:
a set screw, wherein one end of said set screw is supported in a wall of the housing such that said set screw can be turned in place in relation to the housing;
a threaded shell that can be moved axially by the set screw to form a threaded adjustment assembly;
a pivot lever that is supported such that said pivot lever can pivot in relation to the housing about a stationary pivot point in the housing, wherein the stationary pivot point is spaced apart from the at least one pivot axis;
a movement input coupling section of the pivot lever located at a distance to the pivot point, wherein the movement input coupling section is directly coupled in a flexible manner to the threaded shell; and
a movement output coupling section of the pivot lever located at a distance to the pivot point and to the movement input coupling section, wherein the pivot lever is connected to the light module at the movement output coupling section, wherein the movement output coupling section is directly coupled to the light module or to a bracket of the light module, and wherein the movement output coupling section lies between the movement input coupling section and the pivot point.

2. The motor vehicle headlamp as set forth in claim 1, wherein the threaded shell is an integral, materially bonded part, of the pivot lever.

3. The motor vehicle headlamp as set forth in claim 1, wherein the set screw fits into the threaded shell in the assembled state of the adjustment device such that the threaded shell is coupled to the set screw to form a threaded adjustment assembly that can move axially and that is held together by a metal clamp.

4. The motor vehicle headlamp as set forth in claim 1, wherein an interior of the housing is sealed against the housing with an axial seal that includes a hole through which the set screw protrudes such that the set screw can be turned from the outside.

5. The motor vehicle headlamp as set forth in claim 4, wherein the axial seal for the set screw is compressed in the axial direction when the adjustment device is assembled.

6. The motor vehicle headlamp as set forth in claim 5, wherein compression is generated by a first bevel gear that is pressed against axially by the end of the set screw that protrudes outward, thus compressing the axial seal in the axial direction.

7. The motor vehicle headlamp as set forth in claim 6, wherein the housing has an annular bearing surface for the axial seal and receivers for the first bevel gear and a second bevel gear, wherein the rotational axis of the second bevel gear is at an angle to the rotational axis of the first bevel gear, and the second bevel gear meshes with the first bevel gear.

8. The motor vehicle headlamp as set forth in claim 1, wherein the adjustment device has an actuator motor coupled to the movement output coupling section such that the adjustment movements of the movement output coupling section and the actuator motor are combined in an accumulative manner.

9. The motor vehicle headlamp as set forth in claim 8, wherein the coupling is obtained with an intermediate part that also serves as an adapter for different types of actuator motors.

10. The motor vehicle headlamp as set forth in claim 9, wherein the adapter, with the actuator motor, is attached to the movement output coupling section on the pivot lever by a bayonet mount.

11. The motor vehicle headlamp as set forth in claim 9, wherein the adapter is designed to secure an actuator motor plug-in connection.

12. The motor vehicle headlamp as set forth in claim 9, wherein the adapter and actuator motor have symmetrical structures.

13. The motor vehicle headlamp as set forth in claim 1, wherein the set screw and the pivot lever have symmetrical structures.

14. The motor vehicle headlamp as set forth in claim 8, wherein the set screw is placed such that there is the smallest possible offset between the set screw and a central axis of the actuator motor.

* * * * *